Aug. 3, 1943.   J. R. SHOFFNER   2,325,805
CABLE REEL TRUCK
Filed Nov. 25, 1940   6 Sheets-Sheet 3
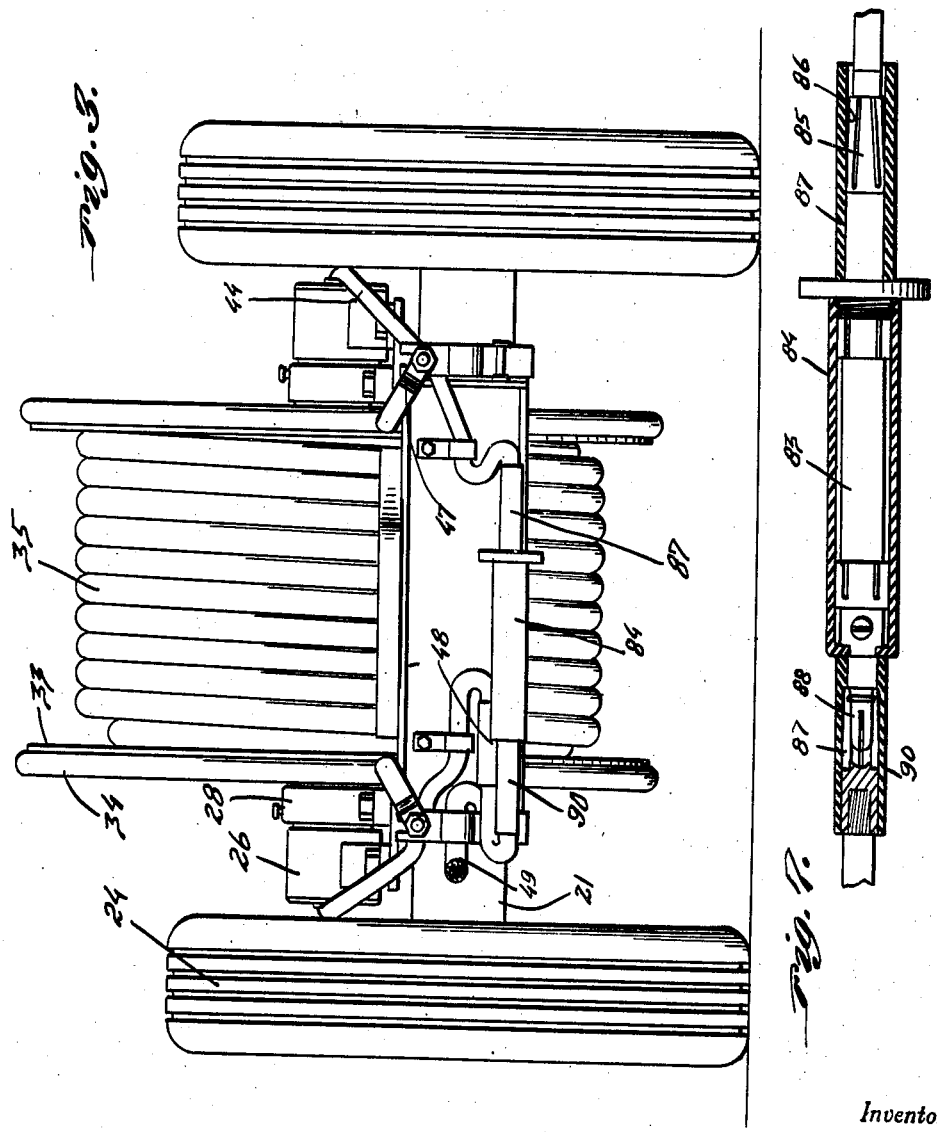
Inventor
John R. Shoffner
By Clarence A. O'Brien
Attorney

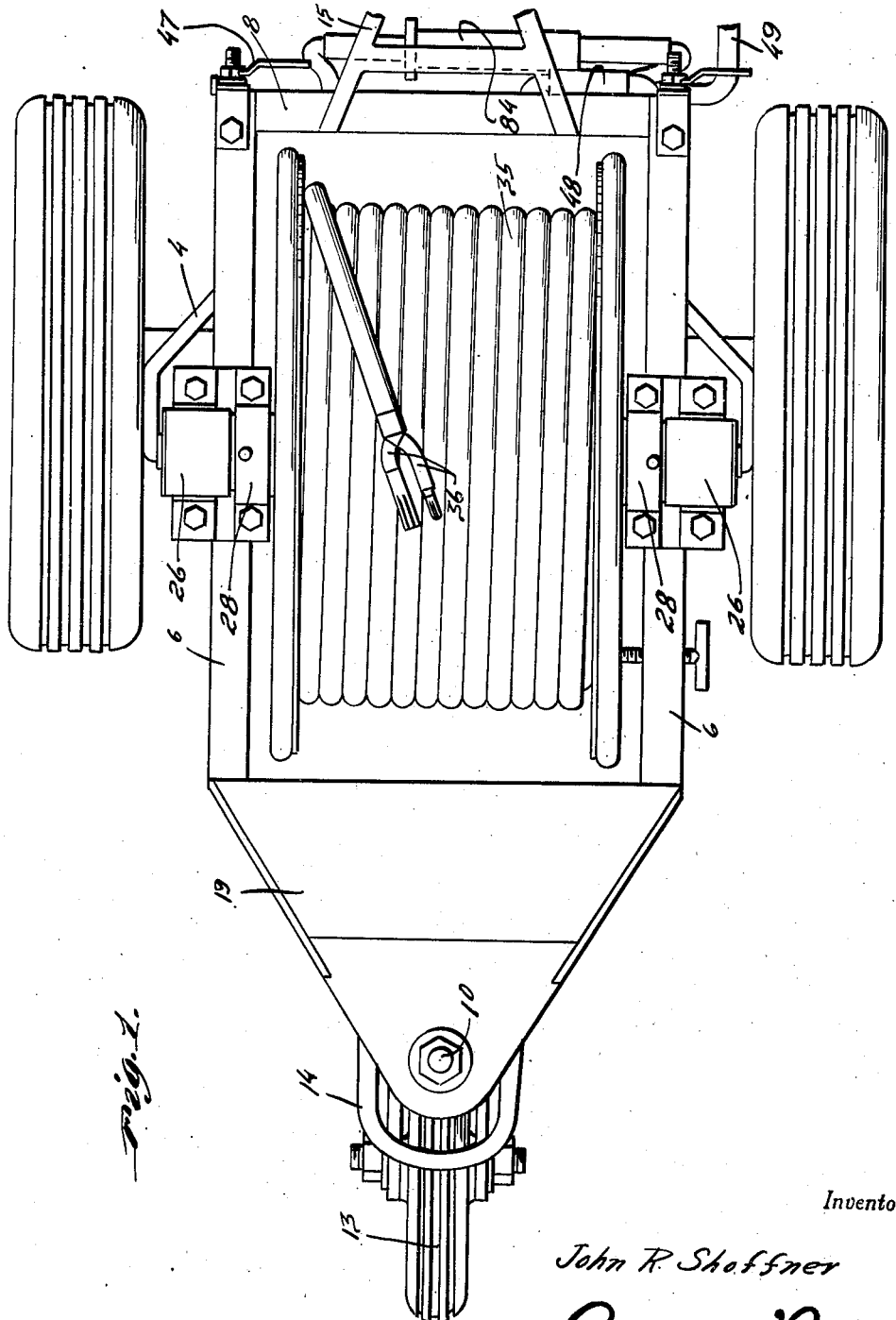

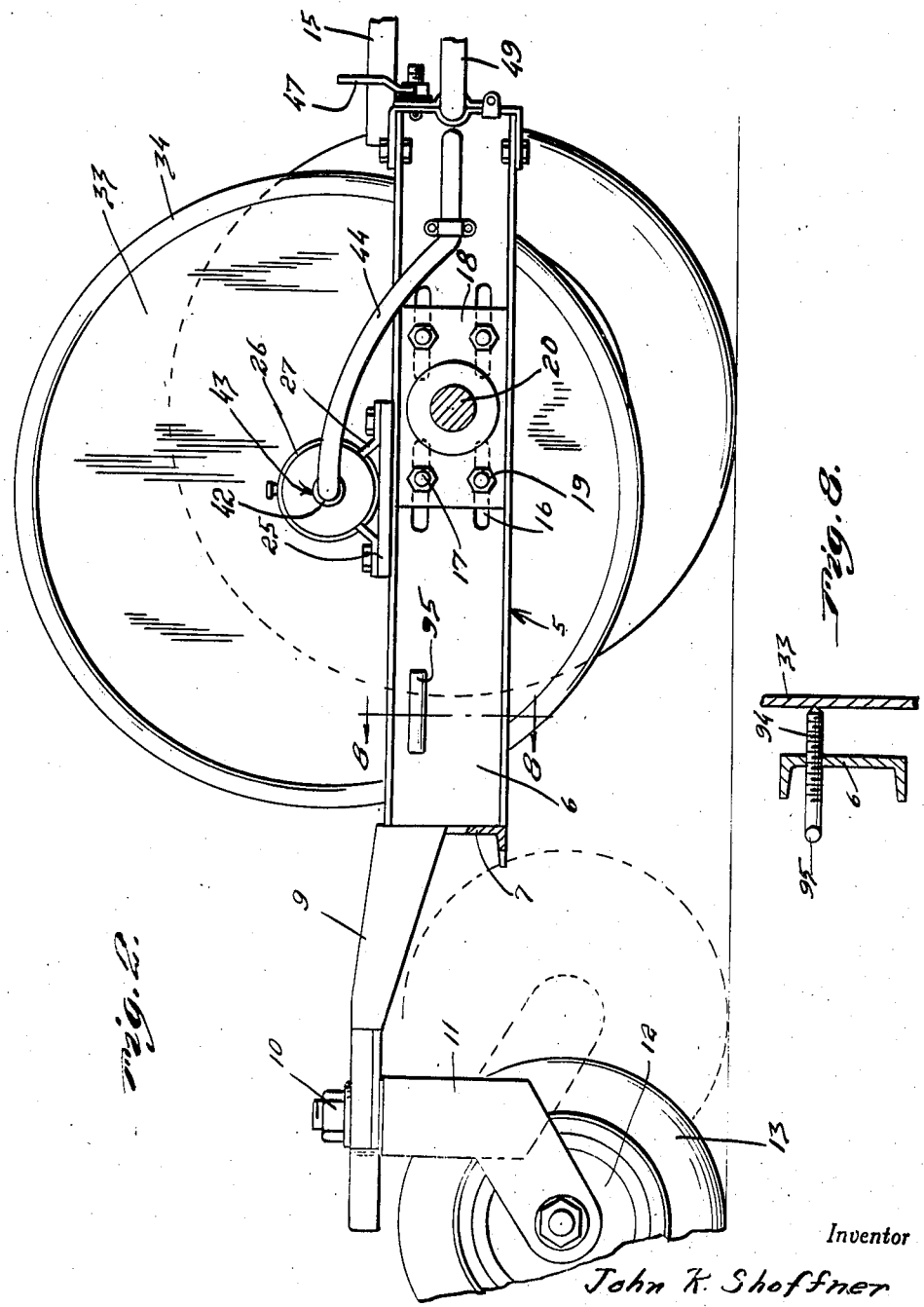

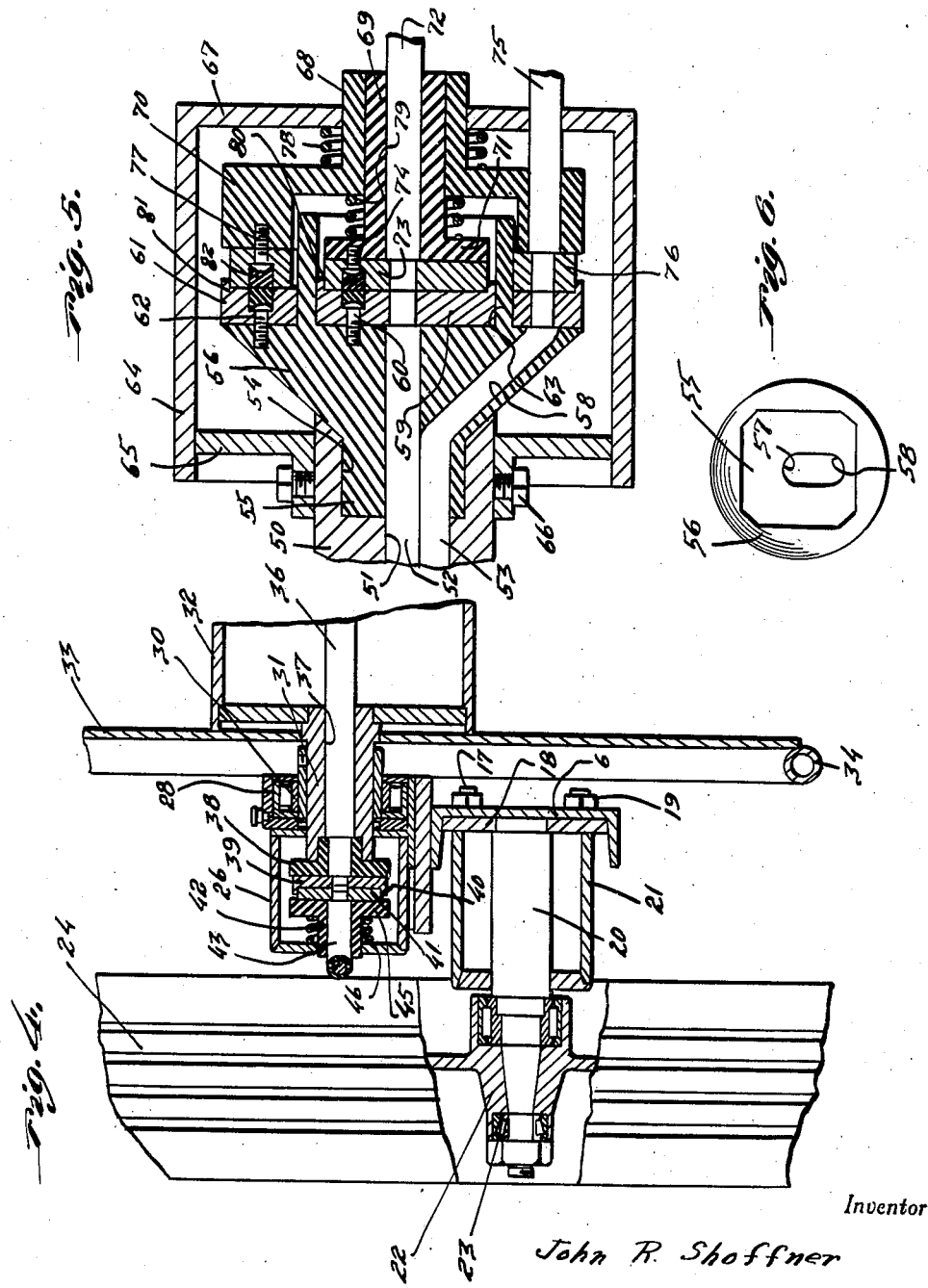

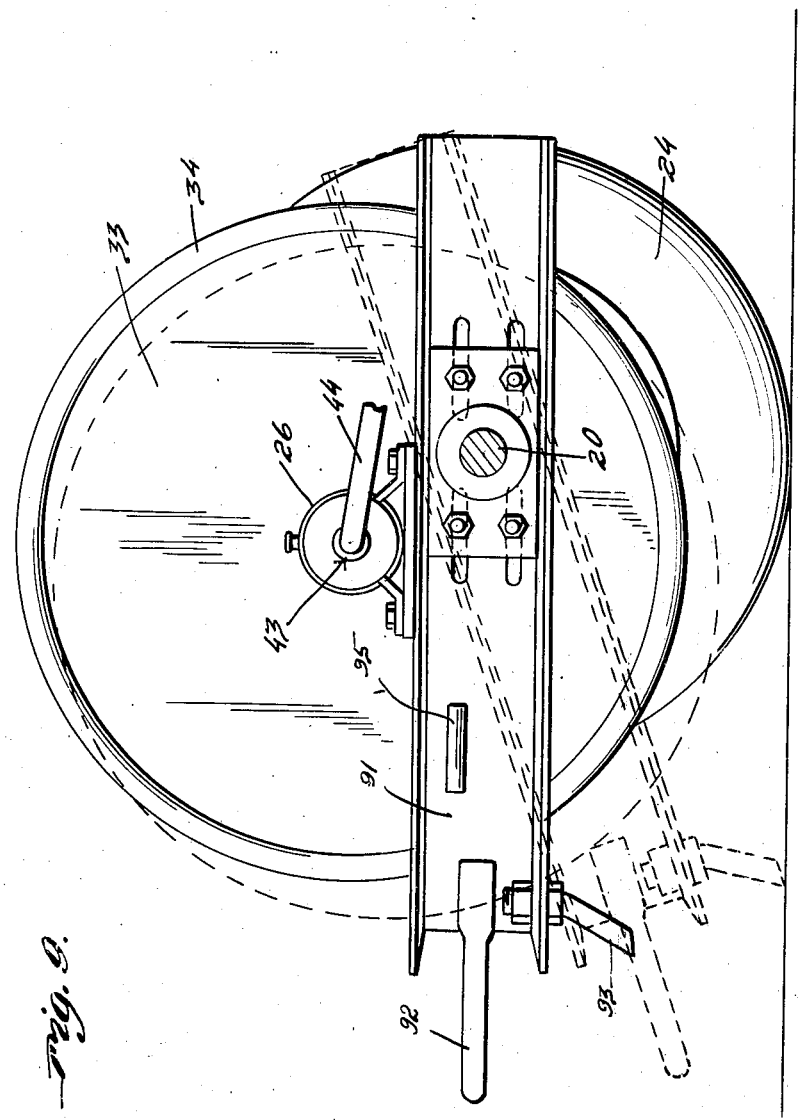

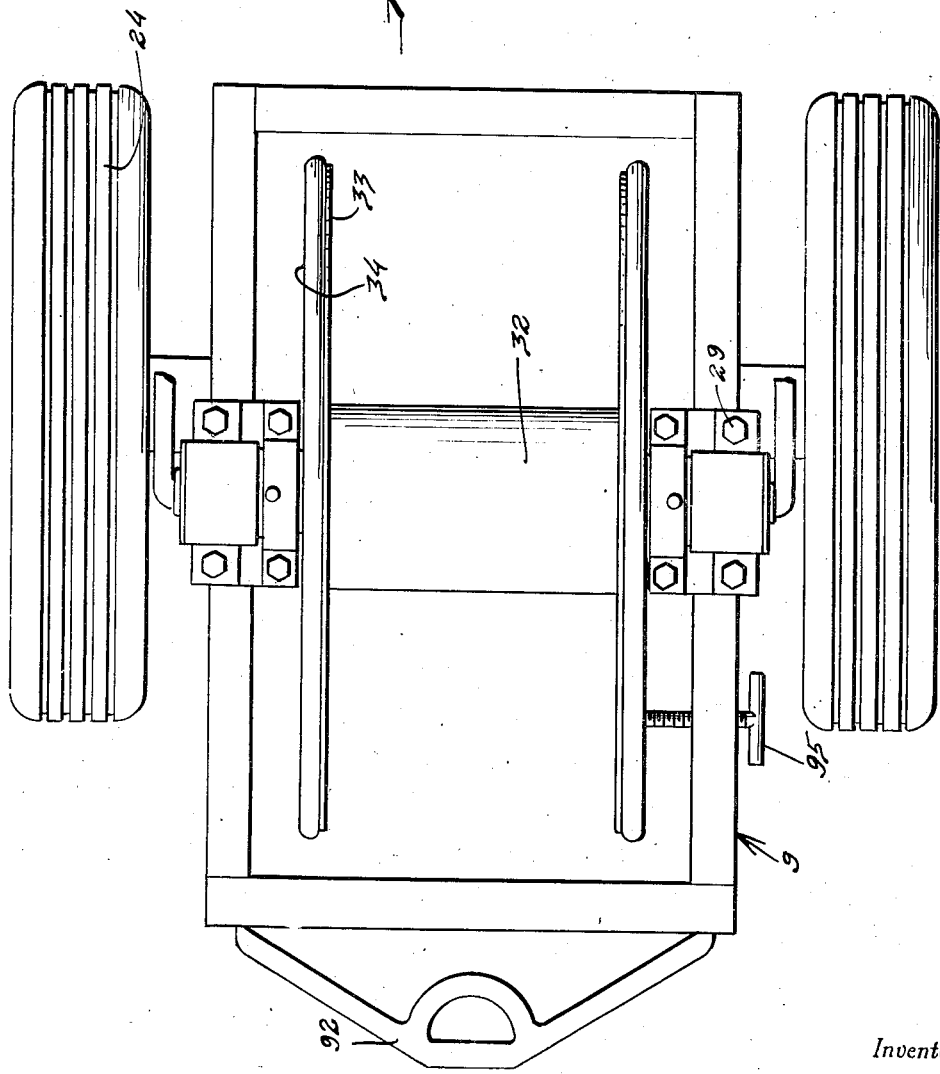

Patented Aug. 3, 1943

2,325,805

UNITED STATES PATENT OFFICE 2,325,805

CABLE REEL TRUCK

John R. Shoffner, Kittanning, Pa.

Application November 25, 1940, Serial No. 367,150

3 Claims. (Cl. 191—12.2)

The present invention relates to new and useful improvements in cable reel trucks designed primarily for use in mining operations for transporting high power electric cables required to transmit electrical energy from a source of supply to an electrical mine working apparatus, and has for its primary object to provide a reel on which the cable may be wound when not in use and from which the cable may be unwound to provide an extension for the electrical current to the mining apparatus when disposed in a remote mine working, the use of the reel eliminating the present dangerous practice of throwing the cable around in a haphazard manner.

A further important object of the present invention is to provide a cable reel truck of this character which is mounted on pneumatic tires capable of transporting the truck to the desired part of the mine.

The invention has for an additional object the provision of a truck having a swivelly mounted caster wheel at one end and a pair of wheels at its other end, the last named wheels being adjustable on the frame of the truck in order to balance the weight of the reel on the wheels of the truck.

A still further object of the invention is to provide novel conductor means extending through the hub of the reel to connect the circuit wires to the inner end of the cable.

A still further object is to provide an apparatus of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a top plan view,

Figure 2 is a side elevational view with parts shown in section,

Figure 3 is a rear end elevational view,

Figure 4 is a sectional view through one side of the mounting for the reel,

Figure 5 is an enlarged sectional view through a modified form of conductor for a three phase cable, Figure 6 is an end elevational view of the insulation head for the double conductor shown in Figure 5, Figure 7 is a longitudinal sectional view of the fuse provided for the cable, Figure 8 is a fragmentary sectional view taken substantially on a line 8—8 of Figure 2 and showing a form of locking device for the cable reel, Figure 9 is a side elevational view of a modified form of truck frame, and Figure 10 is a top plan view thereof.

Referring now to the drawings in detail and with particular reference to the form of the invention illustrated in Figures 1 to 8 inclusive, the numeral 5 designates a substantially rectangular-shaped truck frame constructed of channel iron and including a pair of longitudinal frame members 6—6, a front frame member 7 and a rear frame member 8. Projecting forwardly from the front frame member 7 is a substantially triangular-shaped apron 9 having a kingpin 10 journalled in its forward end, the kingpin projecting upwardly from the top portion of a yoke 11 which extends downwardly beneath the apron and rotatably supports a front wheel 12 at the lower end of said yoke. The wheel 12 is provided with a pneumatic tire 13 and the kingpin 10 provides a swivel mounting for the wheel to enable the free swinging movement thereof from the full line position as shown in Figure 2 to the dotted line position.

Projecting forwardly from the apron 9 is a tow bar 14 preferably in the form of an eye as shown in Figure 1.

A tow bar 15 is likewise secured to the rear frame member 8 and projects rearwardly therefrom, the rear tow bar likewise preferably being in the form of an eye. The longitudinal frame members 6 are provided with a plurality of longitudinally extending slots 16, the slots being arranged in vertically spaced front and rear pairs, the slots adjustably receiving bolts 17 projecting inwardly from the side of a plate 18, the bolts being secured in their respective slots by nuts 19 threaded thereon. Projecting from an opposite side of the plate 18 is a stub axle 20 having its inner end supported in a housing structure 21 and having a wheel hub 22 journalled on its outer end by means of roller bearing assemblies 23. The wheel on the hub 22 is provided with a pneumatic tire 24.

A metal plate 25 is welded or otherwise secured to the upper edge of each of the longitudinal frame members 6 and bolted to each of the plates is a conductor housing 26 by means of legs 27. Inwardly of the housing 26 is a bearing assembly housing 28 also bolted to the plate 25 by bolts 29, the housing 28 having a roller bearing assembly 30 therein and within which is journalled the outwardly projecting trunnions 31 formed on the end portion of a hollow cable reel 32. The reel includes the side flanges 33—33 to the outer surface adjacent the periphery of which is secured the tubular hand grip 34, the hand grip extending circumferentially of the flange.

The cable 35 is adapted for winding on the reel 32, the cable including the negative and positive circuit wires 36 enclosed in a common insulation housing. The circuit wires 36—36 at the inner ends of the cable extend in opposite directions through the reel 32 and outwardly through a bore 37 in the trunnions 31. The outer ends of the trunnions 31 project into the conductor housing 26 and each is provided with an insulation plate or header 38 through which the circuit wire 36 also extends, the outer end of the wire being suitably secured to the central portion of a brass or similar conductor disk 39. The outer surface of the conductor disk 39 is formed with an annular flange 40 within which is fitted a similar conductor disk 41 positioned at one end of an insulation collar 42 which has one end slidably mounted in an opening 43 formed in the outer wall of the housing 26. Extending through the insulation collar 42 is a circuit wire 44 connected to the conductor disk 41, the disks 39 and 41 thus forming an electrical connection between the wires 44 and 36.

The collar 42 is formed with a flange 45 which is engaged by a coil spring 46 to yieldably urge the conductor disks 39 and 41 into contacting engagement, the circuit thus being maintained while the reel 32 is rotated.

The circuit wires 44 projecting outwardly from the conductor housing 26 at each side of the reel extend toward the rear of the frame and are anchored thereto by clamping devices 47. The two circuit wires 44 are connected by a common form of coupling 48 with a cable 49 leading to a suitable source of current.

In certain types of mining machinery three or more circuit wires are necessary leading from the power line and in such instances a connector for one or both ends of the reel is provided embodying the construction shown in Figure 5.

The end of the reel is provided with a trunnion 50 having a bore 51 within which a pair of circuit wires 52 and 53 are carried, the trunnion having its end provided with a counterbore 54 of square shape in cross section and within which is conformably received the extension 55 of a conical insulation head 56. The head is provided with a central bore 57 and an offset bore 58 through which the wires 52 and 53 are respectively carried.

The wire 52 is connected to a conductor disk 59 secured to the base of the head by screws 60 and the wire 53 is connected to a conductor ring 61 also secured to the base of the head by screws 62, the ring being spaced from the disk by an annular outwardly projecting wall 63.

The conductors and insulation head are mounted in a cylindrical housing 64 having an end plate 65 freely mounted in one end and secured to the hub 50 by screws 66. The other end of the housing is provided with a fixed end wall 67 having a central opening for receiving the outer insulation sleeve 68 and the inner coaxial insulation sleeve 69, each having flanges 70 and 71 respectively positioned in the housing. The inner sleeve 69 has the circuit wire 72 inserted therethrough for connection with the conductor disk 73 which is secured to the flange 71 by screws 74, while the circuit wire 75 extends through the flange 70 of the outer sleeve and is connected to the conductor ring 76 which is secured to the flange 70 by screws 77, the wires 72 and 75 leading to the power line.

A coil spring 78 urges the ring 76 in engagement with the ring 61, and a coil spring 79 urges the disk 73 in engagement with the disk 59. The disk 59 as well as the ring 61 are provided with annular flanges 80 and 81 respectively, to prevent lateral movement of the conductors.

The heads of the screws 60, 62, 74 and 77 are countersunk to provide recesses which are packed with graphite 82 for lubricating the contacting surfaces of the conductors.

Interposed in one of the circuit wires, before entering the hub of the reel, is a fuse 83 of conventional construction, the fuse being mounted in a casing 84, one end of the fuse being provided with a tapering stem 85 frictionally received in a split socket 86 attached at the end of the circuit wire, the stem and socket being enclosed in an insulation sleeve 87. At the opposite end of the fuse is a split stem 88 frictionally fitted in a socket 89 attached to the circuit wire and enclosed also in an insulation sleeve 90.

In the form of the invention illustrated in Figures 9 and 10 the truck frame is shown at 91, to which the towing eye 92 is directly attached, in this form of truck construction the front wheel being omitted, and the front end of the truck rests on a downwardly extending rod 93 having its lower end inclined forwardly to bite into a railway tie or ground to anchor the truck.

Each form of the truck is also provided with a reel locking device illustrated in detail in Figure 8 and which comprises a screw 94 threaded through a side of the frame and provided with a pointed end for biting into the flange 33 of the reel to secure the reel against movement. A handle 95 is formed on the outer end of the screw for manipulating the same.

It is believed the details of construction, advantages and manner of use of the device will be readily understood from the foregoing without further detailed explanation.

What I claim is:

1. A cable reel truck comprising a frame, a conductor housing carried at a side of the frame, a reel having a tubular trunnion projecting from one end and rotatably supported in said housing, a plurality of co-axial insulation sleeves having tubular extensions slidably mounted in one end of the housing, conductors carried at the inner ends of the sleeves each having an electric cable connected thereto, an insulation member secured to the trunnion for rotation therewith, a plurality of conductors carried by the member and also having electric cables connected thereto and leading through the trunnion for winding on the reel and spring means mounted on the respective tubular extensions and engaging the sleeves for yieldably urging the conductors into engagement.

2. A cable reel truck comprising a frame, a conductor housing carried at a side of the frame, a reel having a tubular trunnion projecting from one end and rotatably supported in said housing, a plurality of co-axial insulation sleeves having tubular extensions slidably mounted in one end of the housing, conductors carried at the inner ends of the sleeves each having an electric cable connected thereto, an insulation member secured to the trunnion for rotation therewith, a plurality of conductors carried by the member and also having electric cables connected thereto and leading through the trunnion for winding on the reel, spring means mounted on the respective tubular elements engaging the sleeves for yieldably urging the stationary conductors in wiping engagement with the rotatable conductors, the opposed faces of the conductors having recesses therein and a lubricant packed in said recesses.

3. In combination in a cable reel structure, a reel, a supporting frame therefor, a hollow supporting trunnion secured to said reel, a bearing for said trunnion carried by said frame, an insulating head secured to said trunnion and forming a extension thereof beyond said bearing and at the end remote from said reel, two conductor disks located in concentric relationship and secured to the end face of said head, a cable carried by said reel, two electrical conductors extending through the hollow interior of said trunnion and through said head, both being connected to said cable and one being connected to one of said conductor disks and the other being connected to the other of said conductor disks, a housing mounted on said frame, surrounding said head and provided with an opening aligned with said trunnion, concentric insulating sleeves located in said opening and extending into said housing, a conductor disk secured to each sleeve and located concentrically with relation to each other and separate means for actuating each sleeve to force the conductor disk carried thereby into yielding contact with the correspondingly located conductor disk secured to said head.

JOHN R. SHOFFNER.